(12) United States Patent
Urakami et al.

(10) Patent No.: US 8,472,139 B2
(45) Date of Patent: Jun. 25, 2013

(54) SHINGLED MAGNETIC RECORDING (SMR) HEAD WITH BENT TRAILING SHIELD AND METHODS OF PRODUCTION THEREOF

(75) Inventors: Yosuke Urakami, Odawara (JP); Kazue Kudo, Odawara (JP); Hiromi Shiina, Hitachi (JP); Masafumi Mochizuki, Chigasaki (JP); Shouji Tokutake, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/226,377

(22) Filed: Sep. 6, 2011

(65) Prior Publication Data

US 2013/0057981 A1 Mar. 7, 2013

(51) Int. Cl.
*G11B 5/187* (2006.01)
*G11B 5/23* (2006.01)
(52) U.S. Cl.
USPC .............. 360/125.3; 360/119.02; 360/119.04; 360/122
(58) Field of Classification Search
USPC ............. 360/119.02, 119.04, 119.12, 119.13, 360/122, 125.02, 125.3
See application file for complete search history.

(56) References Cited

U.S. PATENT DOCUMENTS

| | | | |
|---|---|---|---|
| 5,075,956 A | 12/1991 | Das | |
| 7,248,431 B1 | 7/2007 | Liu et al. | |
| 7,576,951 B2 | 8/2009 | Allen et al. | |
| 7,748,103 B2 * | 7/2010 | Allen et al. | 29/603.15 |
| 7,808,742 B2 * | 10/2010 | Kamijima et al. | 360/125.02 |
| 7,952,831 B2 * | 5/2011 | Kim et al. | 360/119.03 |
| 8,300,359 B2 * | 10/2012 | Hirata et al. | 360/125.3 |
| 2006/0209469 A1 * | 9/2006 | Akimoto | 360/319 |
| 2007/0035885 A1 | 2/2007 | Im et al. | |
| 2007/0258167 A1 * | 11/2007 | Allen et al. | 360/126 |
| 2009/0122449 A1 | 5/2009 | Kim et al. | |
| 2009/0154012 A1 * | 6/2009 | Mochizuki et al. | 360/123.12 |
| 2009/0154013 A1 | 6/2009 | Sugiyama et al. | |
| 2010/0061016 A1 | 3/2010 | Han et al. | |
| 2010/0159282 A1 | 6/2010 | Lee et al. | |

(Continued)

FOREIGN PATENT DOCUMENTS

| | | |
|---|---|---|
| JP | 2007/272958 A | 10/2007 |
| JP | 2010/287288 A | 12/2010 |
| KR | 2009/050746 A | 5/2009 |

OTHER PUBLICATIONS

English Translation of KR 2009-050746A to Kim et al, published on May 20, 2009.*

*Primary Examiner* — Will J Klimowicz
(74) *Attorney, Agent, or Firm* — Zilka-Kotab, PC

(57) ABSTRACT

In one embodiment, a magnetic head includes a main pole, a trailing shield positioned near a trailing side of the main pole, a side shield positioned near both sides of the main pole in a cross-track direction, a leading shield positioned near a leading side of the main pole, and a gap positioned between the main pole and the shields, characterized in that Sg1<Sg2, wherein Sg1 is a distance in the cross-track direction between a bending point of a leading edge of the trailing shield and a trailing corner of the main pole nearest to the bending point, and Sg2 is a distance in the cross-track direction between a first point on an edge of the side shield parallel in the cross-track direction to the trailing corner of the main pole and the trailing corner of the main pole nearest to the first point.

21 Claims, 13 Drawing Sheets

U.S. PATENT DOCUMENTS

| | | |
|---|---|---|
| 2010/0188783 A1 | 7/2010 | Taguchi |
| 2010/0302680 A1 | 12/2010 | Hirata et al. |
| 2011/0058277 A1 | 3/2011 | de la Fuente et al. |
| 2011/0255196 A1* | 10/2011 | Wu et al. .................... 360/244.2 |
| 2012/0281314 A1* | 11/2012 | Lopusnik et al. ........ 360/125.03 |

* cited by examiner

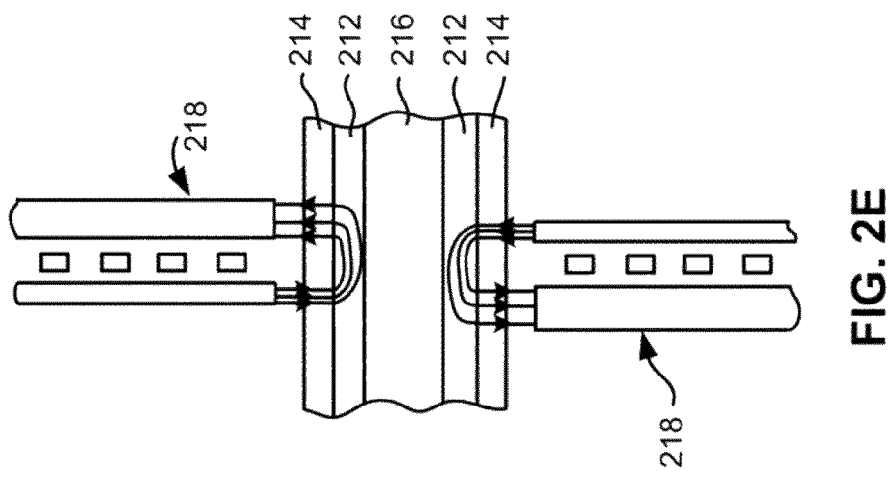
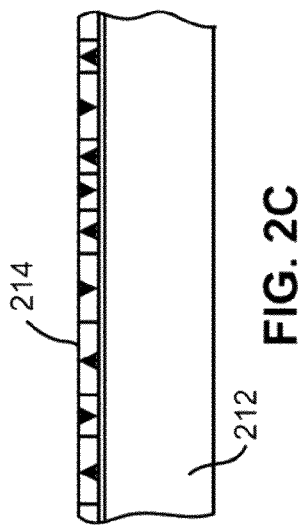
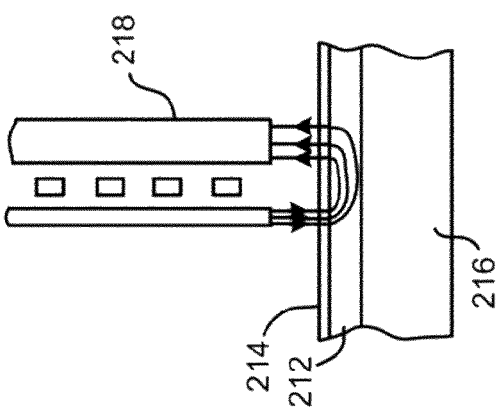
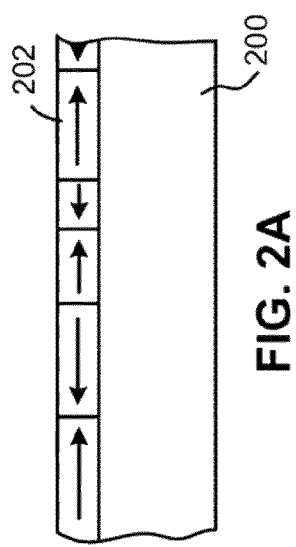
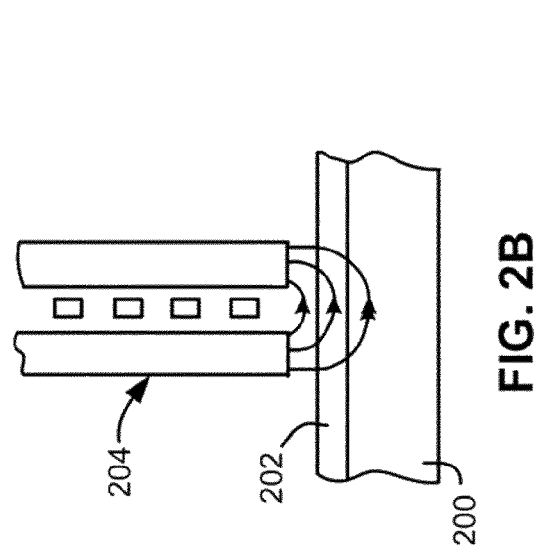

SHINGLED MAGNETIC RECORDING (SMR) HEAD WITH BENT TRAILING SHIELD AND METHODS OF PRODUCTION THEREOF

FIELD OF THE INVENTION

The present application relates to magnetic storage media, and more particularly to a perpendicular magnetic recording head that has a bent trailing shield for use in a magnetic recording device.

BACKGROUND

Shingled magnetic recording (SMR) is a recording system that offers higher areal density than other conventional designs. As shown in FIG. 5, in conventional SMR systems, a main pole (only the tip or corner 506 of which is shown) of a magnetic head is used to write tracks in a shingled arrangement, progressively overlaying a portion of a previously recorded track when a new track is recorded, hence the descriptive name, such that recording is performed with overlapping tracks. Consequently, the actual tracks are recorded using the main pole tip 506, so the recording characteristics of the main pole tip 506 are somewhat determinative of overall system performance. That is to say, it is of great utility to improve the field gradient in the cross-track direction and furthermore to improve the field gradient in the down-track direction, particularly at a position of the magnetic head corresponding to the track edge, e.g., the main pole tip 506.

Some attempts at improving track edge recording characteristics has focused on increasing the field gradient by reducing the side gap width between the main pole 606 and layers around the main pole 606 which may influence the performance of the magnetic head, such as shields, biasing layers, etc. A representation of reducing the side gap width is shown in FIGS. 6A-6B, with a conventional side gap width W1 shown in FIG. 6A, and a reduced side gap width W2 shown in FIG. 6B. However, the side shield problematically absorbs the magnetic field when the side gap is simply narrowed, and the resulting field intensity is inadequate for accurate and precise magnetic recording. Critically, this precludes the ability to achieve the necessary field gradient and frustrates improvements to the magnetic recording device that may be achieved by reducing the side gap width.

With narrow-track hard disk drives in particular, it is desirable to increase the cross-track magnetic field gradient and the down-track magnetic field gradient, particularly at the track edge, while minimizing any deterioration of field intensity at the track edge in order to achieve a high signal-to-noise ratio.

SUMMARY

In one embodiment, a magnetic head includes a main pole, a trailing shield positioned near a trailing side of the main pole, a side shield positioned near both sides of the main pole in a cross-track direction, a leading shield positioned near a leading side of the main pole, and a gap positioned between the main pole and the shields, wherein a cross-section of the trailing shield at a media facing side thereof has a trapezoidal shape.

In another embodiment, a magnetic head includes a main pole, a trailing shield positioned near a trailing side of the main pole, a side shield positioned near both sides of the main pole in a cross-track direction, a leading shield positioned near a leading side of the main pole, and a gap positioned between the main pole and the shields, characterized in that $Sg1<Sg2$, wherein $Sg1$ is a distance in the cross-track direction between a bending point of a leading edge of the trailing shield and a trailing corner of the main pole nearest to the bending point, and $Sg2$ is a distance in the cross-track direction between a first point on an edge of the side shield parallel in the cross-track direction to the trailing corner of the main pole and the trailing corner of the main pole nearest to the first point.

In yet another embodiment, a magnetic head includes a main pole, a trailing shield positioned near a trailing side of the main pole, a side shield positioned near both sides of the main pole in a cross-track direction, a leading shield positioned near a leading side of the main pole, and a gap positioned between the main pole and the shields, characterized in that $Sg1<Sg2$, wherein $Sg1$ is a distance in the cross-track direction between a bending point of a leading edge of the trailing shield and a trailing corner of the main pole nearest to the bending point, and $Sg2$ is a distance in the cross-track direction between a first point on an edge of the side shield parallel in the cross-track direction to the trailing corner of the main pole and the trailing corner of the main pole nearest to the first point, and characterized in that $Sg2<MPw$, wherein $MPw$ is a width of a trailing edge of the main pole in the cross-track direction, wherein a width of a trailing edge of the trailing shield in the cross-track direction is less than about 1.5 times $MPw$.

Any of these embodiments may be implemented in a magnetic data storage system such as a disk drive system, which may include a magnetic head, a drive mechanism for passing a magnetic storage medium (e.g., hard disk) over the head, and a control unit electrically coupled to the head for controlling operation of the head.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

DETAILED DESCRIPTION

Figure 1:
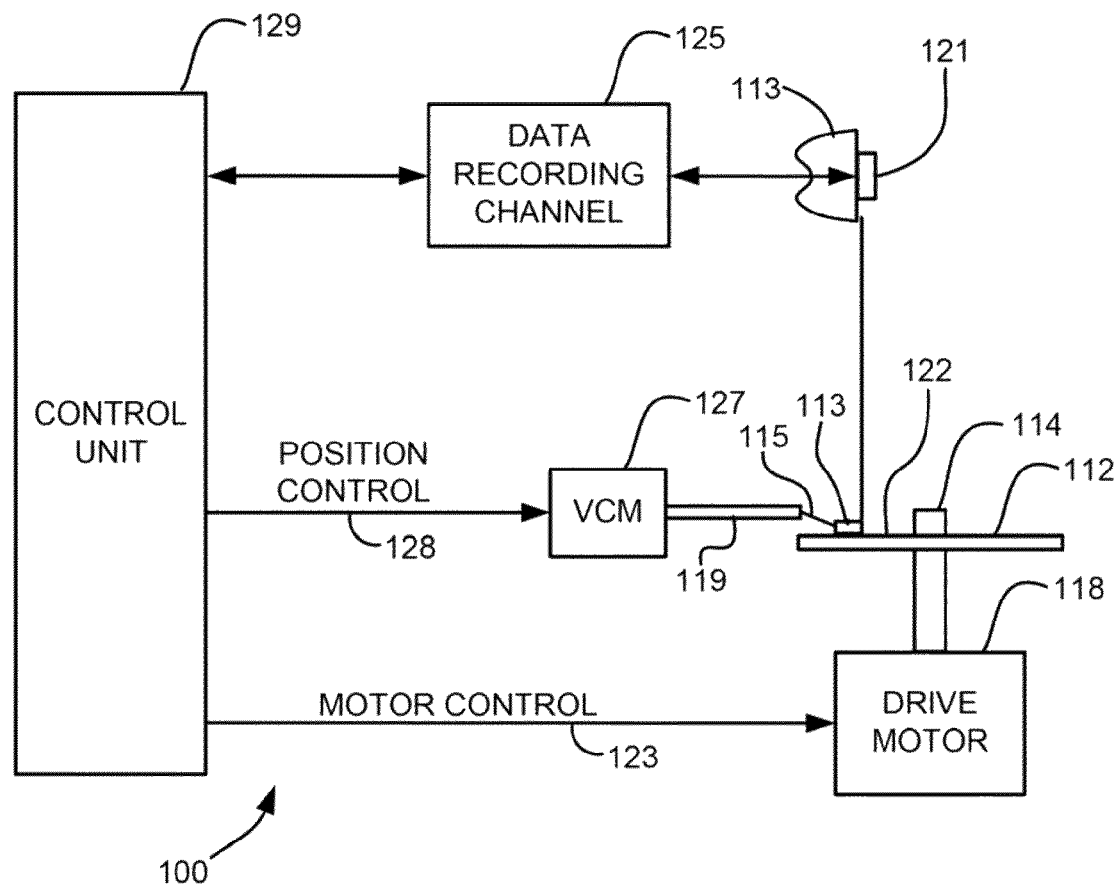
FIG. 1 is a simplified drawing of a magnetic recording disk drive system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic head includes a main pole, a trailing shield positioned near a trailing side of the main pole, a side shield positioned near both sides of the main pole in a cross-track direction, a leading shield positioned near a leading side of the main pole, and a gap positioned between the main pole and the shields, wherein a cross-section of the trailing shield at a media facing side thereof has a trapezoidal shape.

In another general embodiment, a magnetic head includes a main pole, a trailing shield positioned near a trailing side of the main pole, a side shield positioned near both sides of the main pole in a cross-track direction, a leading shield positioned near a leading side of the main pole, and a gap positioned between the main pole and the shields, characterized in that $Sg1<Sg2$, wherein $Sg1$ is a distance in the cross-track direction between a bending point of a leading edge of the trailing shield and a trailing corner of the main pole nearest to the bending point, and $Sg2$ is a distance in the cross-track direction between a first point on an edge of the side shield parallel in the cross-track direction to the trailing corner of the main pole and the trailing corner of the main pole nearest to the first point.

In yet another general embodiment, a magnetic head includes a main pole, a trailing shield positioned near a trailing side of the main pole, a side shield positioned near both sides of the main pole in a cross-track direction, a leading shield positioned near a leading side of the main pole, and a gap positioned between the main pole and the shields, characterized in that $Sg1<Sg2$, wherein $Sg1$ is a distance in the cross-track direction between a bending point of a leading edge of the trailing shield and a trailing corner of the main pole nearest to the bending point, and $Sg2$ is a distance in the cross-track direction between a first point on an edge of the side shield parallel in the cross-track direction to the trailing corner of the main pole and the trailing corner of the main pole nearest to the first point, and characterized in that $Sg2<MPw$, wherein $MPw$ is a width of a trailing edge of the main pole in the cross-track direction, wherein a width of a trailing edge of the trailing shield in the cross-track direction is less than about 1.5 times $MPw$.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion that extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3B:
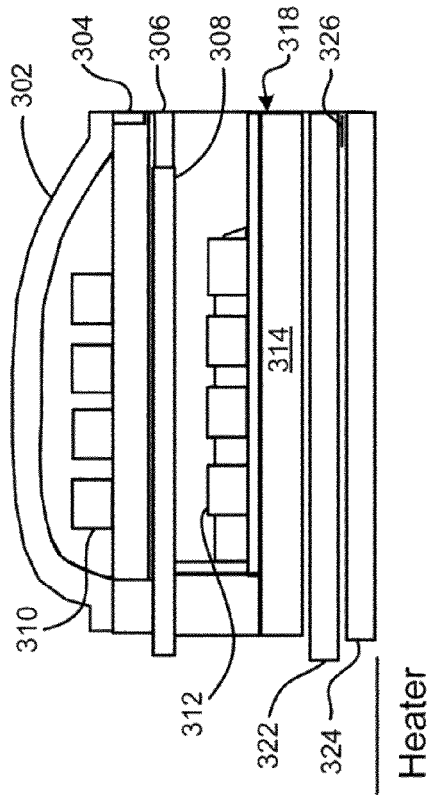
FIG. 3B is a cross-sectional view of one particular embodiment of a piggyback magnetic head with helical coils.
Figure 3A:
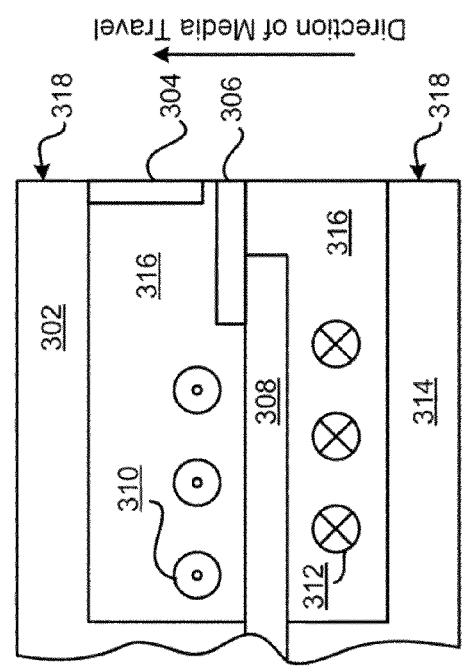
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4B:
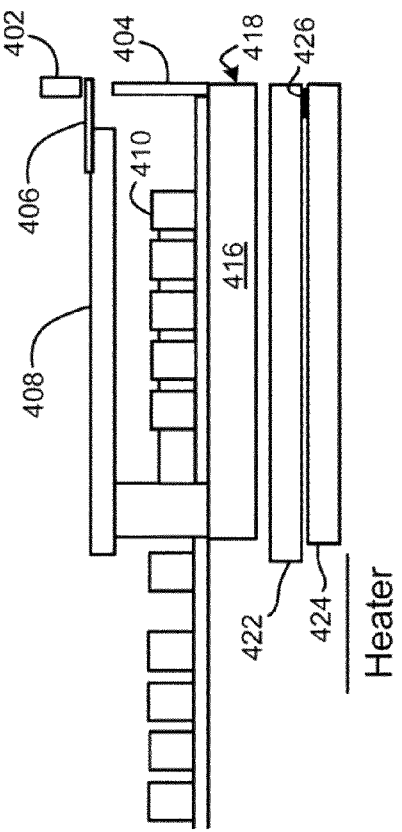
FIG. 4B is a cross-sectional view of one particular embodiment of a piggyback magnetic head with looped coils.
Figure 4A:
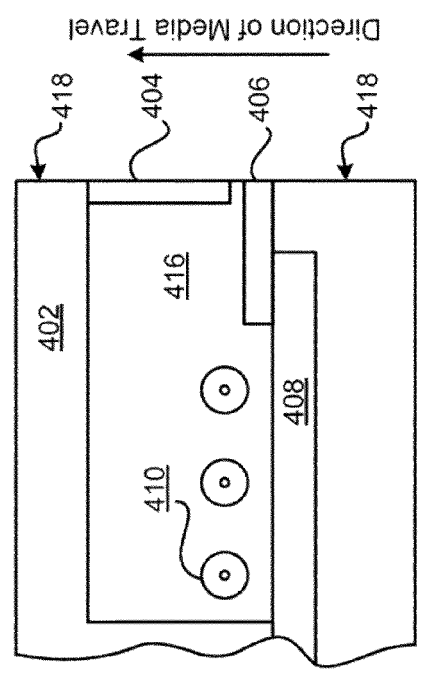
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
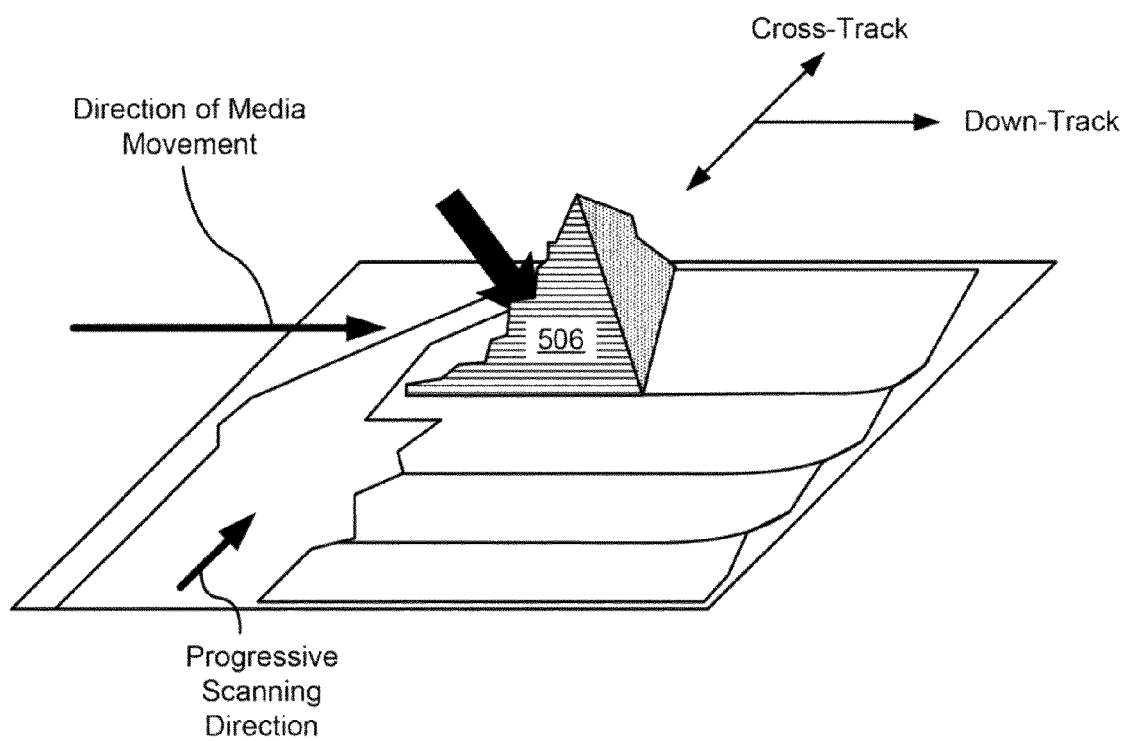
FIG. 5 shows a schematic view of a conventional shingled magnetic recording system, according to the prior art.

FIG. 5 depicts a conventional SMR system, according to the prior art. As shown, the system includes a magnetic head 506 (only a corner of which is shown) that moves in a direction consistent with the down-track direction. Furthermore, the system conducts progressive scans in a direction consistent with the cross-track direction. This systems writes progressively overlapping tracks 502 on the magnetic medium.

Figure 6A:
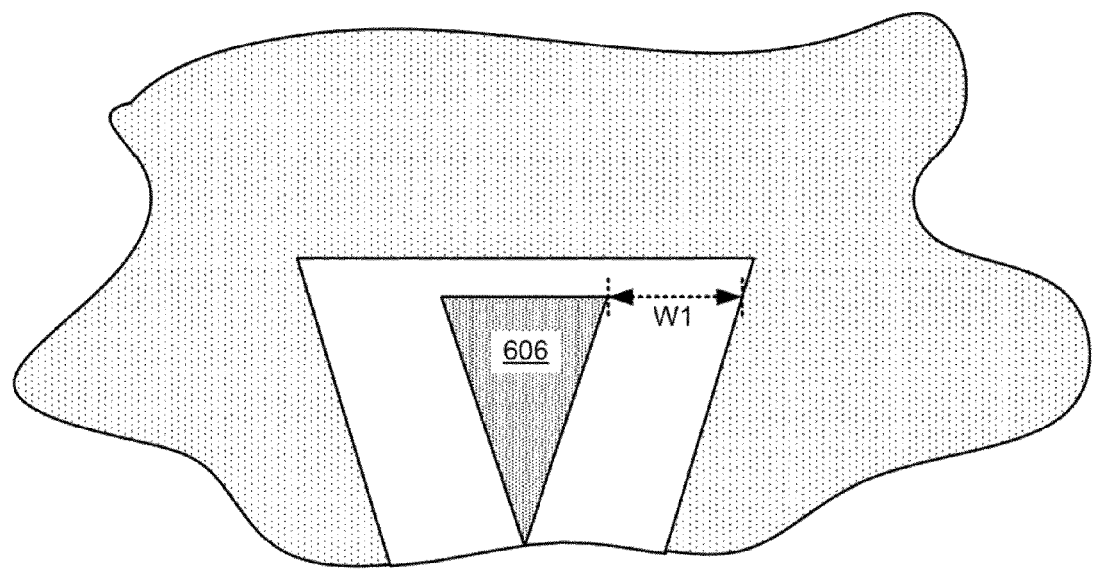
FIG. 6A shows a cross-sectional view of a side-gap structure with conventional thickness, according to the prior art.
Figure 6B:
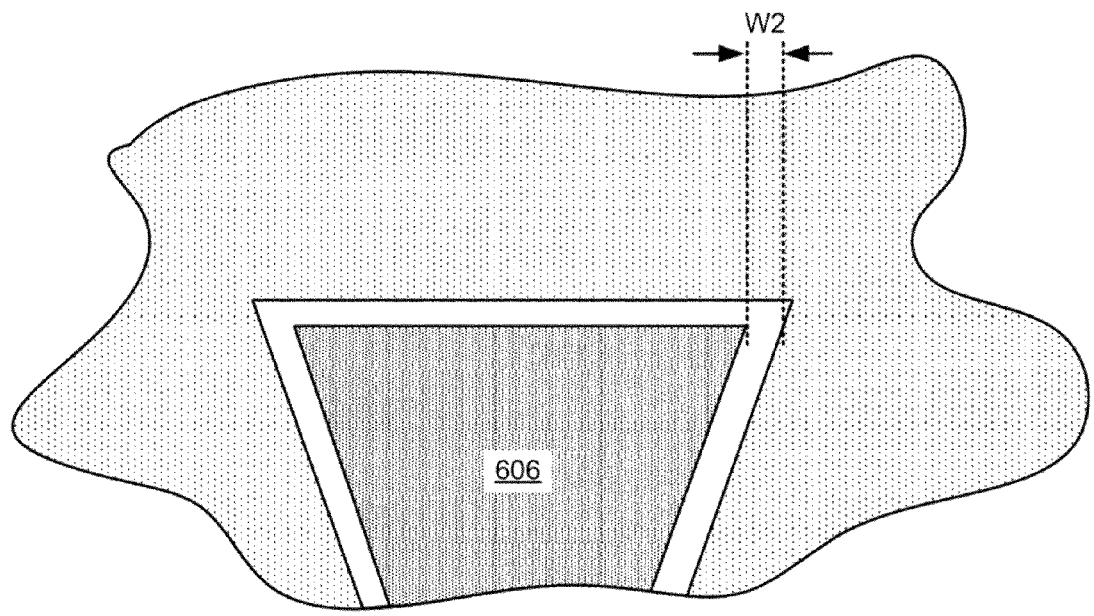
FIG. 6B shows a cross-sectional view of a side-gap structure with reduced thickness, according to the prior art.

FIGS. 6A and 6B shows a conventional approach to increasing cross-track field gradient by reducing the width of the side gap in a magnetic head, according to the prior art, where FIG. 6A represents a conventional head with conventional side-gap width W1, and FIG. 6B represents a conventional head with reduced side-gap width W2. As discussed previously, this approach introduces additional problems that must be accounted for.

Figure 7:
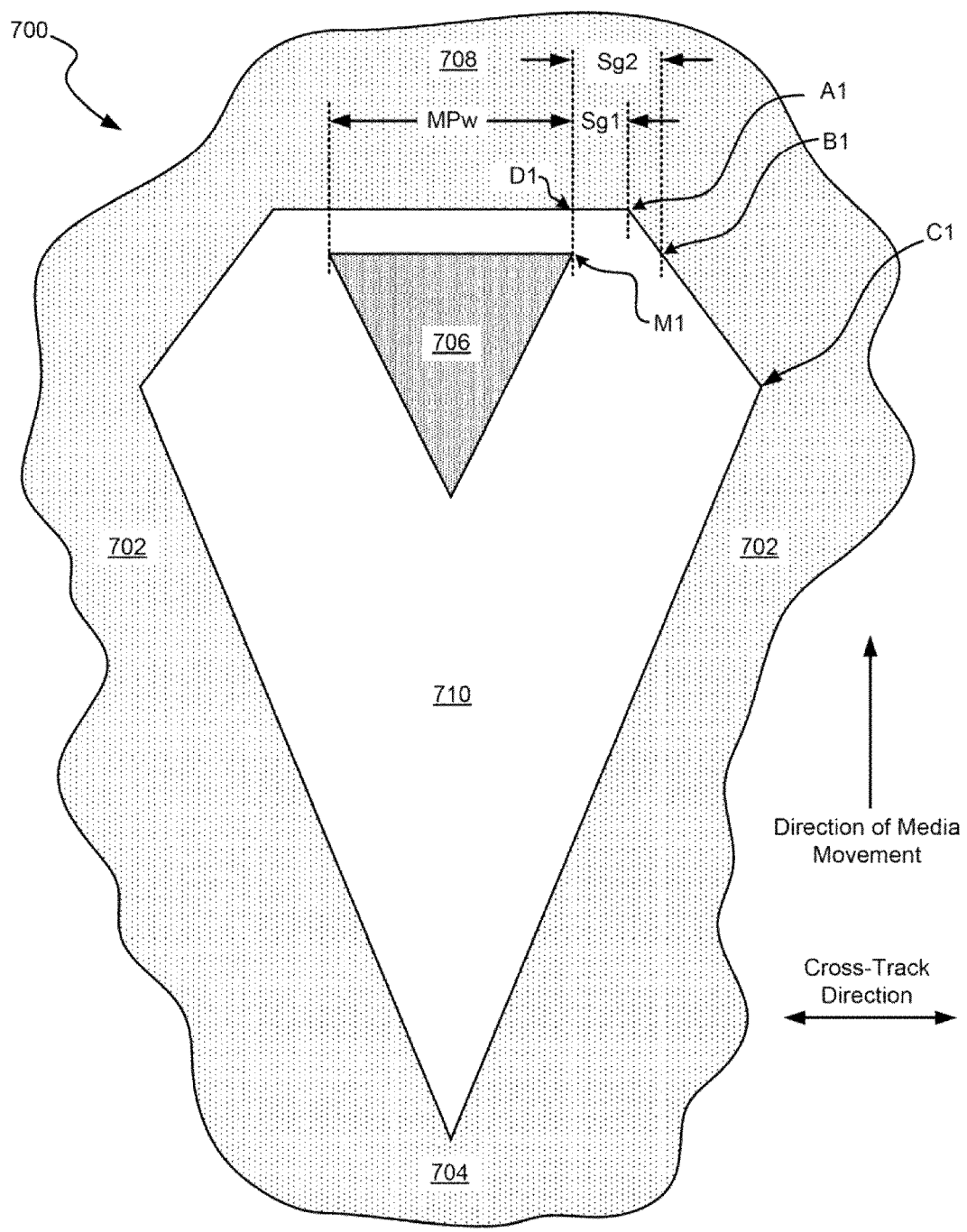
FIG. 7 shows a cross-sectional view of an inverted magnetic head structure, according to one embodiment.

Now referring to FIG. 7, according to one embodiment, a perpendicular magnetic recording head 700 includes a main pole 706, a trailing shield 708, a side shield 702, and a leading shield 704 for the main pole 706. The main pole 706, in some embodiments, may have a gap 710 between the shields and the main pole 706. The gap 710 may comprise any suitable material, as would be known in the art.

In one embodiment, the shields 702, 704, 708 may be formed as separate parts in different deposition steps. In an alternate embodiment, one or more of the shields may be formed as a continuous structure in a single deposition step, as would be understood by one of skill in the art upon reading the present descriptions.

The gap 710 may be referred to herein as a trailing gap, which is positioned on a trailing side of the main pole 706 in a direction normal to the cross-track direction. Also, a side gap may be referred to herein, which is positioned on one or both sides of the main pole 706 in the cross-track direction. Similarly, a leading gap may refer to a gap positioned on a leading side of the main pole 706.

In one embodiment, points A1 and C1 denote bending points of the trailing shield and side shields, while the trailing main pole 706 tip is denoted by point M1. Point A1 denotes a bending point in the trailing shield 708 and point C1 denotes a bending point in the side shield 702. Furthermore, the intersection of the side shield 702 with a straight line running through point M1 that is parallel to the cross-track direction is denoted by point B1, and the intersection of the trailing shield 708 with a straight line running through point M1 that is parallel to the direction of media movement is denoted by point D1.

Moreover, the distance between points D1 and A1 is defined as Sg1, and the distance between points M1 and B1 is defined as Sg2. In addition, in one embodiment, a line drawn through point C1 in the cross-track direction, as shown in FIG. 7, would intersect with the main pole 706, e.g., the bend in the side shield 702 occurs at a point even with the main pole 706 in the cross-track direction. Furthermore, the main pole 706 width is indicated by MPw.

In some embodiments, point A1 may be further defined as a point of intersection of a line extending from an angle tangent to the trailing shield 708 at point B1 and a line extending from an angle tangent to the trailing shield 708 at point D1.

According to one embodiment, the dimensions of the three shields 702, 704, 708 of the perpendicular magnetic recording head 700 preferably satisfy the following relationships at a media facing side of the head 700 (FIG. 7 is a cross-sectional view according to one embodiment taken from the media facing side).

In a first inequality, $Sg1<Sg2$, where Sg1 is a distance in a cross-track direction from a corner (denoted as M1) of a trailing side of the main pole 706 to a bending point (denoted as A1) of a leading side of the trailing shield 708. Since the leading side of the trailing shield 708 and the main pole 706 do not lie along a common line in the cross-track direction, Sg1 may be measured from point A1 to point D1, which represents a point on the trailing shield 708 which corresponds to the trailing corner of the main pole 706.

In a second inequality, $Sg2<MPw$, where Sg2 is a distance in the cross-track direction from the corner (denoted as M1) of the trailing side of the main pole 706 and an intersection (denoted as point B1) of the side shield 702 with a straight line running through the corner (denoted as M1) of the trailing side of the main pole 706 that is parallel to the cross-track direction. Since the trailing side of the main pole 706 and the side shield 702 lie along a common line in the cross-track direction, Sg2 is easily measured between the points.

Each of the shields 702, 704, 708 of the perpendicular magnetic recording head 700 may comprise the same material, in one embodiment. In addition, the shields may be formed in a single process, according to a further embodiment. Of course, in an alternate embodiment, some or all of the shields may comprise different materials, as would be apparent to one-of skill in the art upon reading the present descriptions.

The cross-track direction and the direction of media movement as shown in FIG. 7 are for reference only, and in operation of the head 700, the head 700 may be slanted or tilted as would be understood by one of skill in the art, thereby rendering the directions shown inconsistent with the operating directions. However, the dimensions, distances, thicknesses, widths, etc., that are described in reference to the cross-track direction and the direction of media movement are based on the directions shown in FIG. 7, and not on any actual movement or cross-track directions.

In one embodiment, a magnetic head 700 comprises a main pole 706, a trailing shield 708 positioned near a trailing side of the main pole 706, a side shield 702 positioned near both sides of the main pole 706 in the cross-track direction, a leading shield 704 positioned on a leading side of the main pole 706, and a gap 710 positioned between the main pole 706 and the shields.

Figure 11:
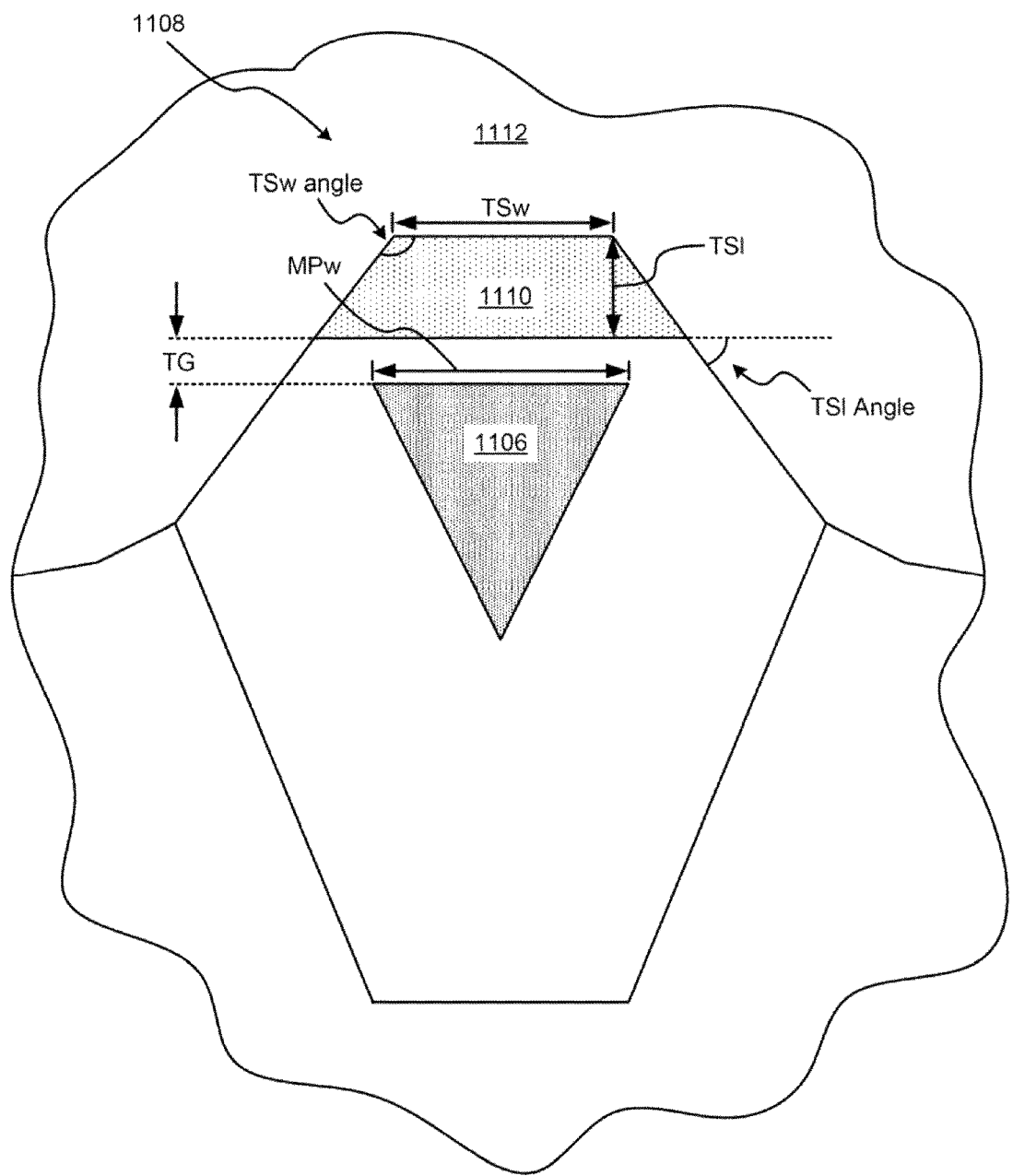
FIG. 11 is a schematic view defining several parameters of an inverted magnetic head structure, according to one embodiment.

In one embodiment, a cross-section of the trailing shield 708 at a media facing side thereof may have a trapezoidal shape, as is described in more detail in reference to FIG. 11. According to a further embodiment, the trapezoidal shape of the cross-section of the trailing shield 708 at the media facing side thereof may be positioned such that a wider side of the trapezoidal shape in the cross-track direction is a leading portion of the trailing shield.

Referring again to FIG. 7, according to one embodiment, a cross-section of the main pole 706 at a media facing side thereof may have either a triangular shape, a trapezoidal shape, or a combination of a triangular shape and a trapezoidal shape.

In another embodiment, a cross-section of an exterior perimeter of the gap 710 at a media facing side thereof may have a diamond shape characterized by a linear trailing edge about parallel to the cross-track direction, a pointed leading edge, and side edges extending between the trailing edge and the leading edge, each of the side edges comprising a first linear edge extending from the leading edge, a second linear edge extending from the trailing edge, and a point at an intersection of the first and second edge. In an alternate embodiment, a cross-section of the exterior perimeter of the gap 710 at the media facing side thereof may be characterized by a linear trailing edge about parallel to the cross-track direction, a linear leading edge about parallel to the linear trailing edge, and side edges extending between the trailing edge and the leading edge, each of the side edges comprising a first linear edge extending from the leading edge, a second linear edge extending from the trailing edge, and a point at an intersection of the first and second linear edge.

In one preferred embodiment, the magnetic head 700 may be characterized in that Sg1<Sg2, wherein Sg1 is a distance in the cross-track direction between a bending point (denoted as point A1) of a leading edge of the trailing shield 708 and a trailing corner (denoted as point M1) of the main pole 706 nearest to the bending point, and Sg2 is a distance in the cross-track direction between a first point (denoted as point B1) on an edge of the side shield 702 parallel in the cross-track direction to the trailing corner (denoted as point M1) of the main pole 706 and the trailing corner (denoted as point M1) of the main pole 706 nearest to the first point (denoted as point B1).

In another preferred embodiment, the magnetic head 700 may be characterized in that Sg2<MPw, wherein MPw is a width of a trailing edge of the main pole 706 in the cross-track direction.

According to one approach, a portion of the gap 710 trailing the main pole 706 (e.g., the trailing gap) may have a length in a direction normal to the cross-track direction in a plane of the media facing side in a range from about 5 nm to about 50 nm, such as 10-25 nm, preferably about 20 nm.

In another approach, a width of the main pole 706 at a trailing edge thereof in the cross-track direction may be in a range from about 60 nm to about 150 nm, such as about 80-110 nm, preferably about 100 nm.

According to one approach, a width of a trailing edge of the trailing shield 708 in the cross-track direction may be less than about 1.5 times a width of the main pole 706 at a trailing edge thereof in the cross-track direction. In a further approach, the width of the trailing edge of the trailing shield 708 in the cross-track direction may be about equal to the width of the main pole 706 at the trailing edge thereof in the cross-track direction.

In another embodiment, a length of the trailing shield 708 in a plane of a media facing side in a direction normal to the cross-track direction may be in a range from about 25 nm to about 100 nm, such as about 40-60 nm, preferably about 50 nm.

According to one approach, an angle formed at an intersection of a leading edge and a side edge of the trailing shield 708 may be in a range from about 20° to about 60°, such as about 40-50°, preferably about 45°.

Figure 8:
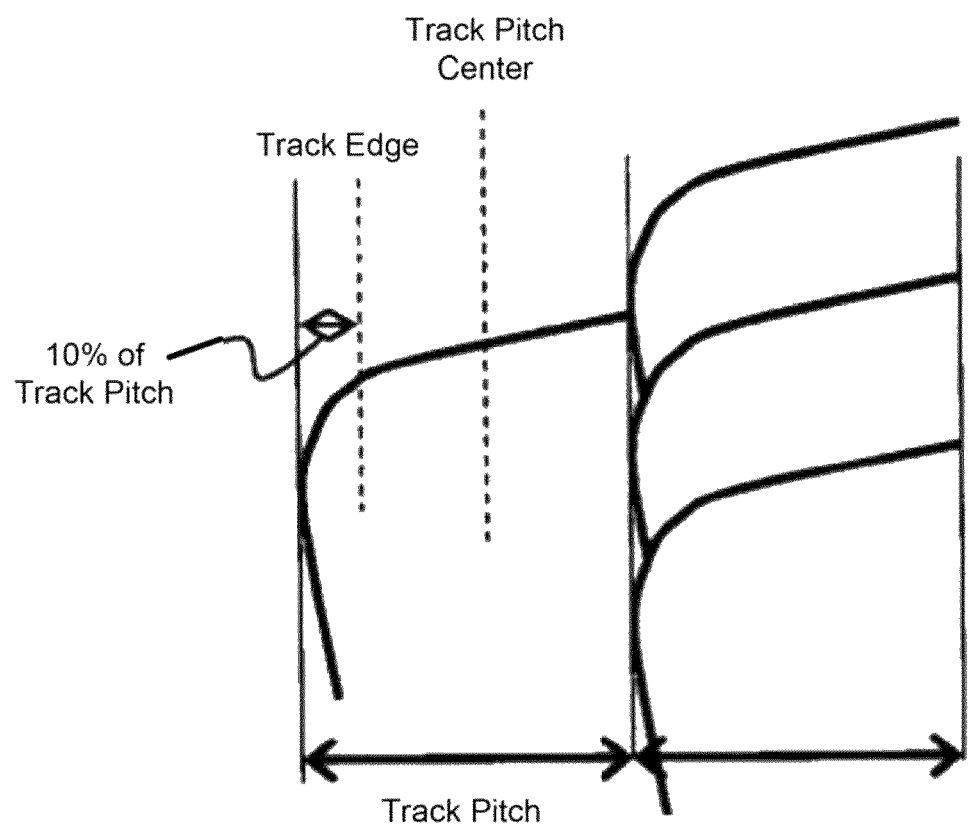
FIG. 8 shows a graph depicting field gradient evaluations in a shingled magnetic recording device, according to one embodiment.

The field distribution obtained by an electromagnetic field simulation using the finite element method was evaluated in order to serve as an index for measuring improvements conveyed by utilizing an inverted magnetic head structure as described herein. As an index of the head field for increasing the signal-to-noise ratio (SNR), it is advantageous for the field gradient to be high in the down-track direction at a prescribed track pitch center (as shown in FIG. 8) when shingled recording is performed. Furthermore, in preferred embodiments, the field gradient in the down-track direction may also be high at the track edge (defined as a position 10% of the distance away from the track end, as shown in FIG. 8). Further still, it is even more advantageous to have a high cross-track gradient, according to some approaches.

When utilizing an inverted head structure as described herein, it is possible, in some embodiments, to increase both the down gradient at the track edge and the cross-track gradient by one and a half times while the field gradient of the track pitch center is maintained.

Next, the areal density gain was calculated in embodiments with a head having the structure as described herein that is employed in an SMR system. According to these calculations, it is possible to increase the density of tracks per inch (TPI) by about 20% by reducing the adjacent track erase band width to two-thirds of that in conventional structures. Furthermore, it was possible to simultaneously increase the SNR by 1 dB and linear track density by 100 kbpi by improving recording quality via a steep field gradient at the track edge. In addition, in some embodiments, there was no observed acute angle projection at the shield, so it was possible to prevent far track erasure caused by spontaneous shield domains, and it was further possible to produce a highly reliable hard disk device.

Figure 9A:
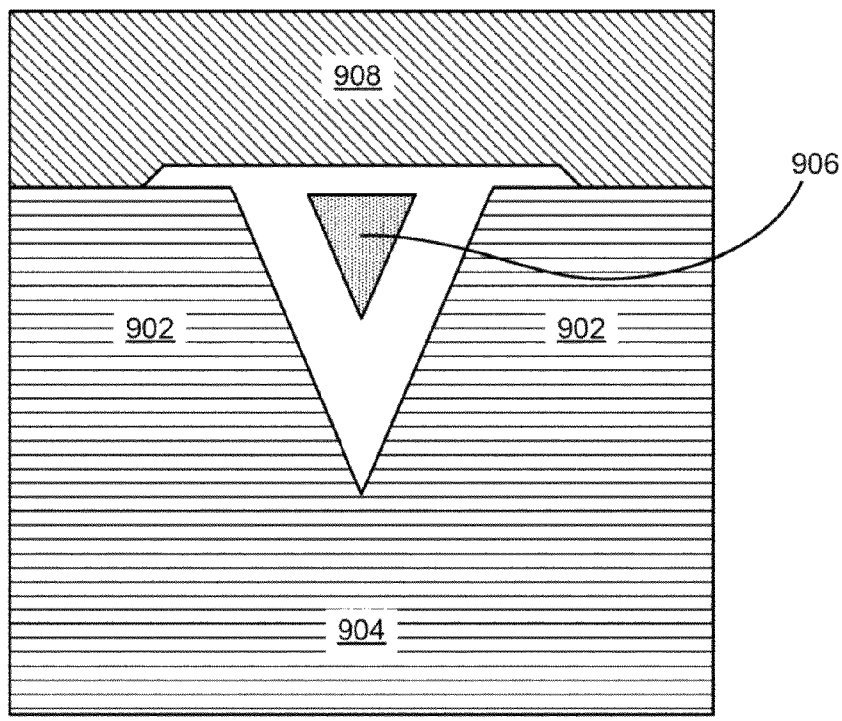
FIG. 9A is a cross-sectional schematic of a conventional magnetic head structure, according to the prior art.
Figure 9B:
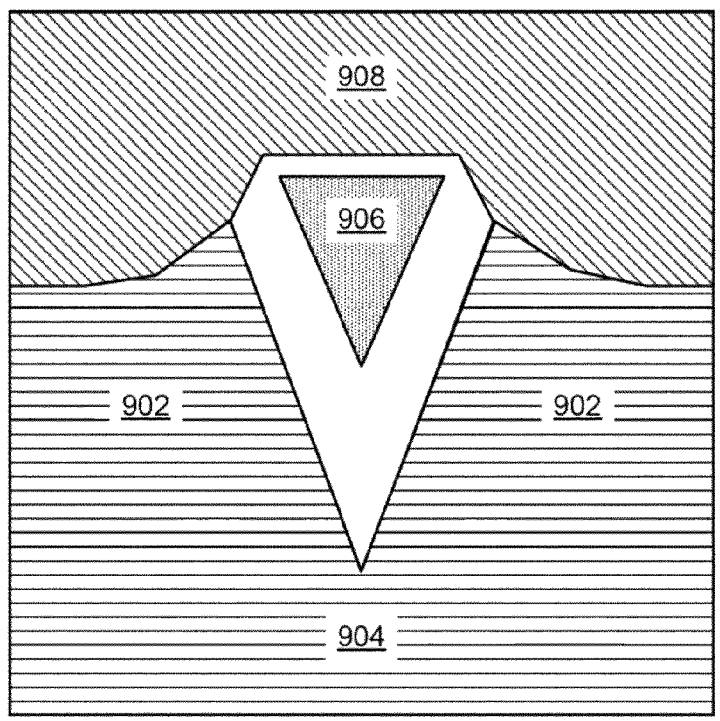
FIG. 9B is a cross-sectional schematic of an inverted magnetic head structure, according to one embodiment.

A magnetic head according to a conventional structure is shown in FIG. 9A, according to the prior art. As can be seen, the trailing shield 908 covers the trailing edge of the main pole 906 and extends beyond sides of the main pole 906 in the cross-track direction. In contrast, as shown in FIG. 9B, an inverted magnetic head according to one embodiment, the shields around the main pole 906 have two bending points on either side of the main pole 906 in the cross-track direction. In addition, the main pole 906 is positioned further above the leading shield, allowing the corners of the trailing edge of the main pole 906 to be isolated by a thinner layer of the shield in those positions.

These structures as shown in FIGS. 9A-9B were evaluated experimentally. In these experimental comparisons, the head structures, down-track pitch center gradient, down-track edge field gradient, and cross-track field gradient in the cross-track direction with a corresponding change in the width of the side gap were calculated using a finite element method.

Figure 10B:
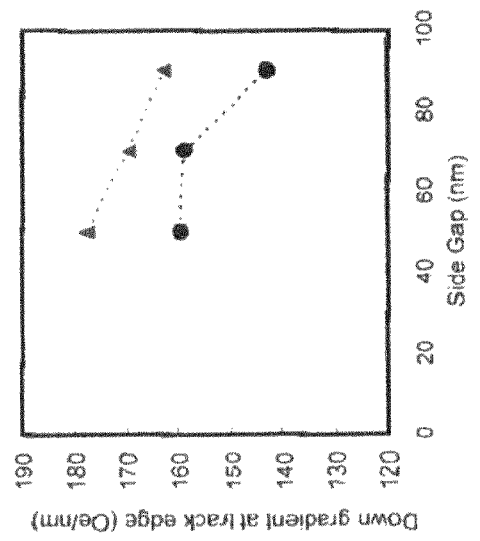
FIG. 10B is a graph comparing the down-track field gradient at a track edge in a conventional, conformal magnetic head structure and an inverted magnetic head structure, according to one embodiment.
Figure 10C:
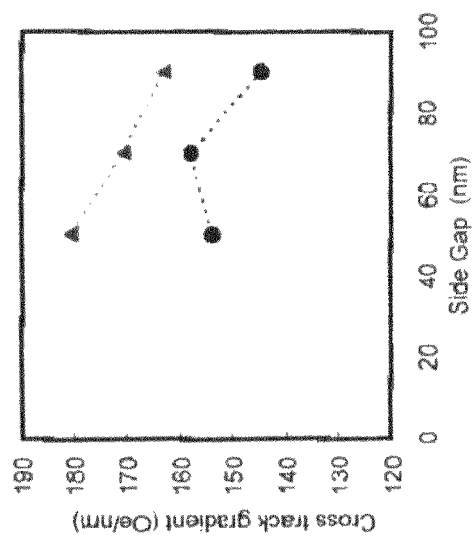
FIG. 10C is a graph comparing the cross-track field gradient in a conventional, conformal magnetic head structure and an inverted magnetic head structure, according to one embodiment.
Figure 10A:
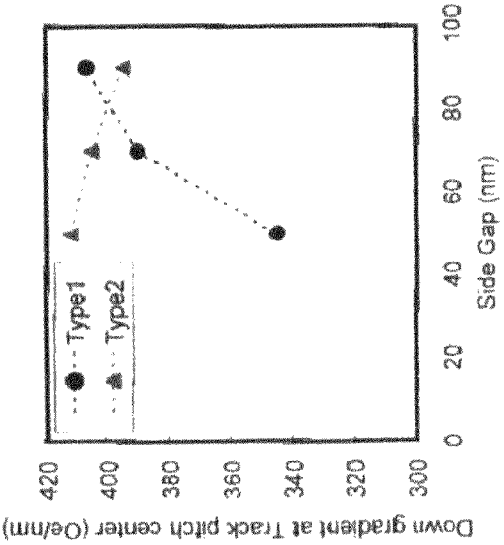
FIG. 10A is a graph comparing the down-track field gradient at a track pitch center in a conventional, conformal magnetic head structure and an inverted magnetic head structure, according to one embodiment.

In each experimental evaluation, as shown in FIGS. 10A-10C, the track pitch was set at approximately 60 nm. Furthermore, a FeCo-based alloy with a width of about 90 nm in the down-track direction was employed as the main pole, and the trailing shield and side shield employed a NiFe-based alloy. Moreover, the trailing shield gap length was set to approximately 20 nm, the distance between the main pole and the backing layer was about 47 nm, and the site of magnetic field evaluation was approximately 15 nm away from the media facing surface of the main pole. In addition, the bending angle of the trailing shield which is the interior angle of the edge of the trailing shield taken at the bending point, designated as point A1 in FIG. 7, was approximately 45° degrees.

FIG. 10A shows the side gap dependency of the field gradient at the track pitch center, according to one embodiment. In the conventional magnetic head structure (designated as Type1), the field gradient deteriorated considerably at the track pitch center due to the narrowing of the side gap combined with a reduction in field intensity. By comparison, the inverted head structure (Type2), according to one embodiment, exhibited a field gradient increase in conjunction with the narrowing of the side gap, which is very beneficial to head operation.

FIG. 10B similarly shows the down-track gradient at the track edge, according to one embodiment. The gradient increased as the side gap narrowed in both the conventional (Type1) head structure according to the prior art and the inverted (Type2) head structure, according to one embodiment. However, in the inverted structure, the highest field gradient was demonstrated under narrower side gap conditions, in contrast to the conventional structure where the high down-track gradient at the track edge is continued even with a larger side gap. This tendency was also observed in relation to the cross-track gradient, where the field gradient tended to increase in both conventional and inverted head structures in conjunction with the narrowing of the side gap.

However, in some embodiments, the inverted structure exhibited an improved gradient under narrower side gap conditions, as shown in FIG. 10C. Therefore, it is possible to produce both an improved field gradient at the track pitch center, as shown in FIG. 10A, and an improved field gradient at the track end. Furthermore, preferred embodiments of the inverted head structure enables a hard disk device with higher areal density than possible using conventional magnetic head structures.

FIG. 11 shows an inverted head structure, according to one embodiment. As represented in FIG. 11, the main pole 1106 is characterized by having a width MPw at the leading edge thereof According to some embodiments, the MPw may be in a range from about 60 nm to about 150 nm, such as about 100 nm. Furthermore, a trailing edge of the trailing shield 1108 may have a width (TSw) of about the width MPw of the trailing edge of the main pole 1106. Of course, TSw may be longer or shorter than MPw, in some approaches.

According to one embodiment, the trailing shield 1108 may comprise two distinct materials, which may form different portions of the trailing shield 1108. For example, the trailing shield 1108 may comprise a portion 1110 comprising a first material having a higher Bs than another material forming a different portion 1112 of the trailing shield 1108. In addition, the first material portion 1110 may be positioned near a trailing edge of the trailing shield 1108, in one approach. Also, the trailing shield 1108 may have length TSl in the media movement direction (i.e., normal to the cross-track direction) in a range from about 25 nm to about 100 nm, such as about 50 nm. Furthermore, the first material near the trailing edge of the trailing shield 1108 may have a length in a range from about 40 to about 100 nm, in some approaches. In addition, in some embodiments, the trailing gap length TG which is the distance between the trailing edge of the main pole 1106 and the leading edge of the trailing shield 1108 may be in a range from about 5 nm to about 50 nm, such as about 20 nm.

In some preferred embodiments, as shown in FIG. 11, a cross-section of the trailing shield 1108 at a media facing side thereof may have a trapezoidal shape. In some further approaches, the widest portion of the trapezoidal shape may be on a leading edge of the trailing shield 1108.

An angle TSl Angle as shown in FIG. 11 is the angle between a line extending from the leading edge of the trailing shield 1108 closest to the main pole 1106 along a line parallel to the trailing edge of the main pole 1106 and the leading edge of the side shield. Another angle TSw Angle as shown in FIG. 11 is the angle between the trailing edge of the trailing shield 1108 and the side edges (in a cross-track direction) of the trailing shield 1108.

These angles are represented in a trailing shield 1108 that has a cross-section at a media facing side thereof of a trapezoidal shape. However, other shapes are possible, as would be understood by one of skill in the art upon reading the present descriptions, such as triangular, polygonal, rectangular, combinations thereof, etc.

Figure 12:
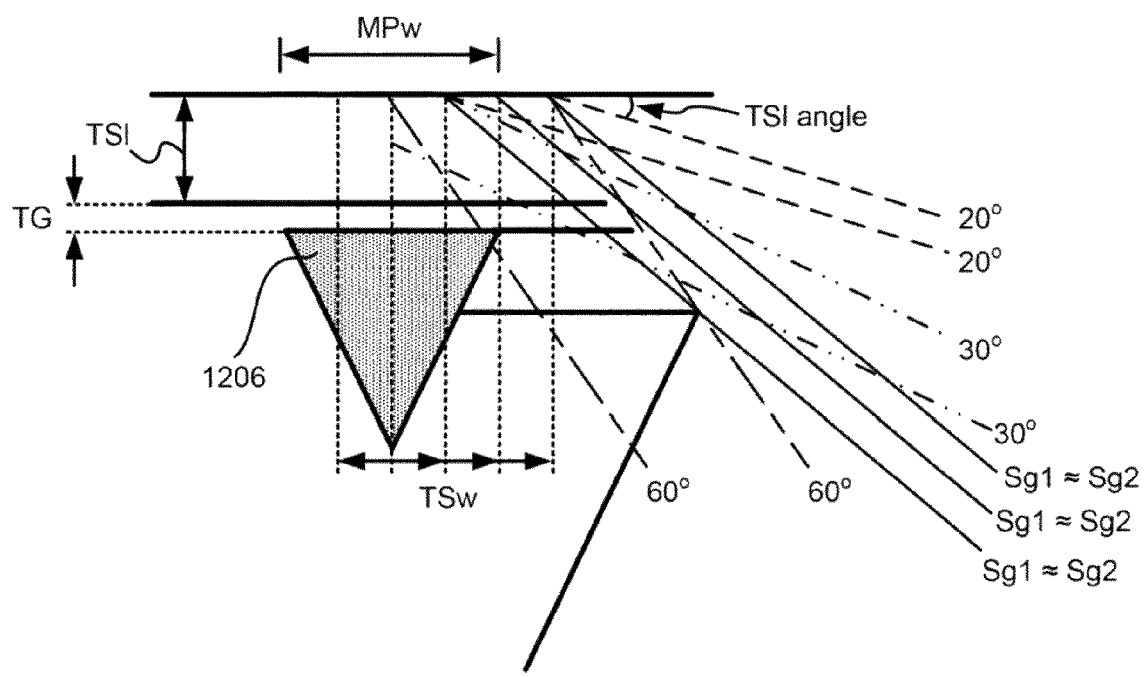
FIG. 12 is a schematic in cross-section of a magnetic head showing the various trailing shield bend angles, TSw Angle and TS Angle, possible within an inverted magnetic head structure, according to one embodiment.

A referential calculation model using actual dimensions and depicting the relationship of the TS Angle and the width of the side gap is shown in FIG. 12, according to one embodiment. The effect of changing the trailing shield bending angle (TSw Angle) and the trailing shield length (TSl) on the recording characteristics of an inverted magnetic head structure, according to various embodiments, were investigated using this calculation model, with the results shown in FIG. 13A-13C. These results assume a high intensity magnetic field (Bs) trailing shield with a length (TS1) of approximately 50 nm, the width of the trailing edge thereof being the trailing shield width (TSw). Furthermore, the main pole 1206 width (MPw) was about 100 nm and the trailing gap length (TG) was about 20 nm in these experiments.

Figure 13B:
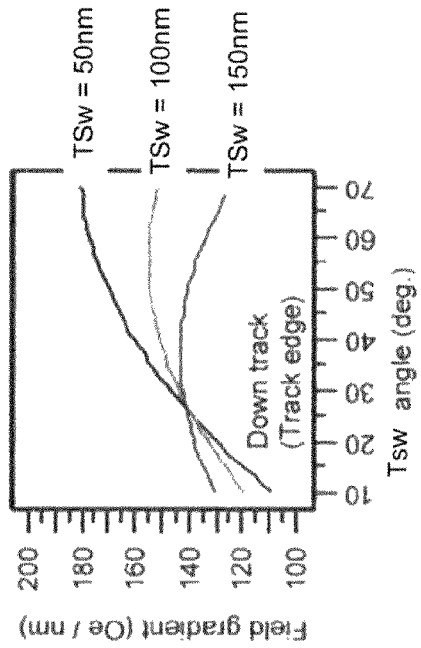
FIG. 13B shows a relationship between the trailing shield length (TSl) and the TS Angle, and the resulting impact on the down-track field gradient at a track edge, according to one embodiment.
Figure 13C:
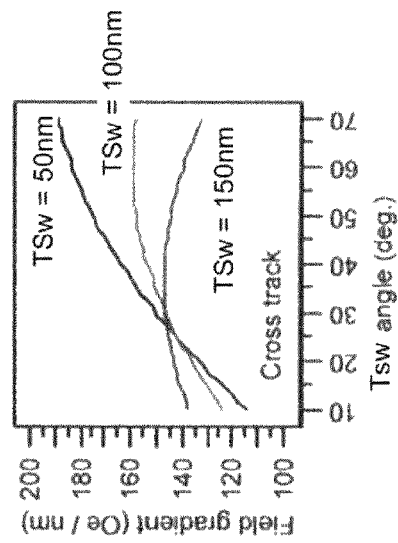
FIG. 13C shows the relationship between the trailing shield length (TSl) and the TS Angle, and the resulting impact on the cross-track field gradient, according to one embodiment.
Figure 13A:
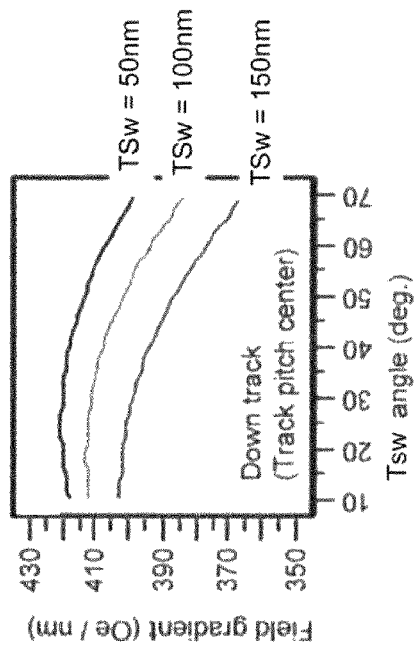
FIG. 13A shows a relationship between the trailing shield length (TSl) and the TS Angle, and the resulting impact on the down-track field gradient at a track pitch center, according to one embodiment.

According to the results of the calculations shown in FIG. 13A-13C, the gradient at the track edge and the cross-track gradient, which were the focus of this investigation, tended to improve with increasing trailing shield width (TSw). However, the gradient at the track pitch center considerably decreased when the TS Angle exceeded about 60 degrees. Thus, the side shield's tendency to absorb the magnetic field caused a corresponding reduction in the strength of the magnetic field. Consequently, the TS Angle is preferably between about 20° and about 60° in order to achieve compatible recording characteristics at the track center and the track end. Furthermore, field strength calculations were computed where trailing shield width (TSw) was set to approximately 50 nm, 100 nm, and 150 nm, respectively. When the trailing shield width (TSw) was excessively wide, the effectiveness of the side shield was reduced, and therefore the recording characteristics deteriorated accordingly.

In preferred embodiments, the trailing shield width (TSw) was no more than approximately one and a half times that of the main pole width (MPw) in order to improve the recording field gradient at the track edge. This improvement is especially effective and advantageous in systems employing shingled magnetic recording (SMR). When this structure was used, it was possible to improve both the gradient in the down-track direction at the track edge and the cross-track gradient by approximately 50% compared with the conventional head structure, as shown in FIG. 9A.

The gain in areal density compared with a conventional structure was calculated by micromagnetic simulation for the magnetic head having a structure consistent with the above calculations. The inverted head structure, in one embodiment, exhibited an erase-band width of approximately two-thirds that of the conventional magnetic head structure due to the improved cross-track field gradient. This corresponds to an increase in the track pitch of about 20% over conventional head structures. Furthermore, the SNR was increased by 1 dB due to the improved field gradient in the down-track direction at the edge. The accumulation of these gains produces a corresponding advantageous increase in areal density of approximately 30% over conventional structures.

Figure 14A:
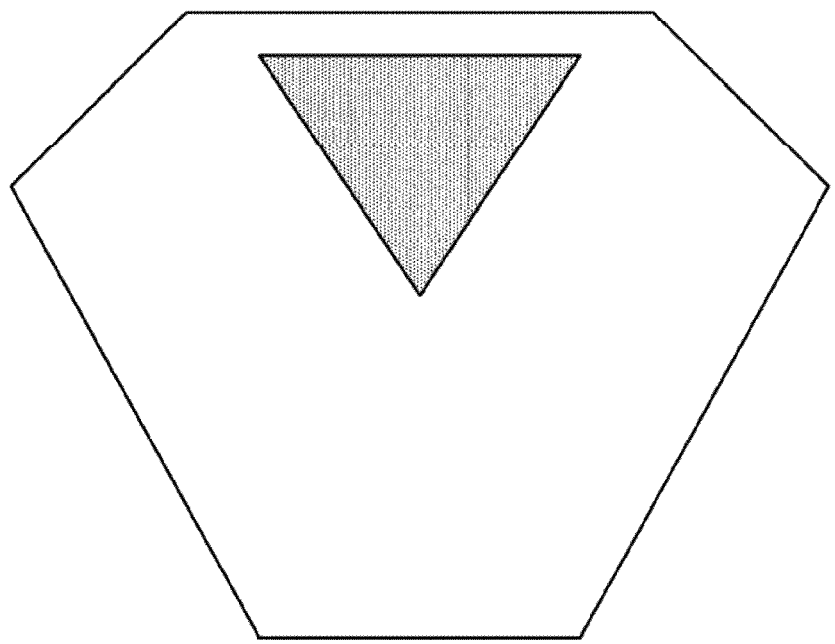
FIG. 14A shows a cross-sectional view of the shape of a trailing shield and a main pole in an inverted magnetic head, according to one embodiment.
Figure 14B:
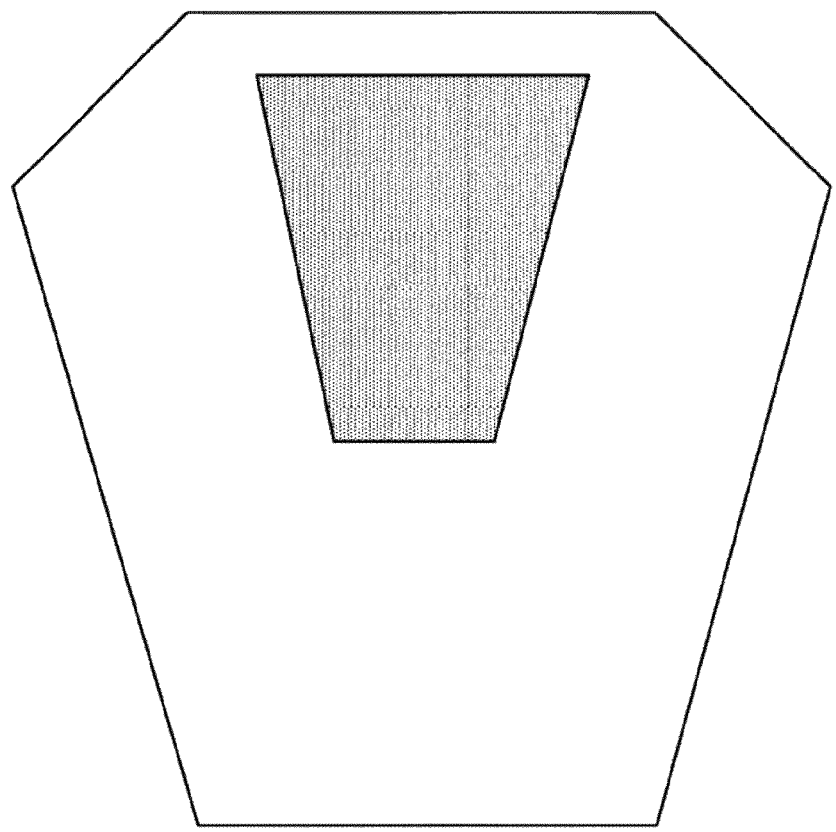
FIG. 14B shows a cross-sectional view of the shape of a trailing shield and a main pole in an inverted magnetic head, according to another embodiment.

While the above results were observed using an inverted magnetic head structure having a triangular shape, such as that shown in FIG. 14A, similar effects are possible in alternative embodiments employing a main pole that is trapezoidal in shape, as shown in FIG. 14B. Furthermore, regarding the shape of the shields, in preferred embodiments, the leading shield trailing edge may be flat, as shown in FIGS. 11 and 14A-B, or may have an inverted pointed structure, as shown in FIGS. 7 and 9B, among other possible structures as would be apparent to one of skill in the art upon reading the present descriptions.

Furthermore, conventional shield shapes unfavorably permit track erasure if the magnetic field is concentrated at the shield end (a phenomenon also known as "far track erasure"). The inverted magnetic head structure proposed herein, according to various embodiments, avoids this problematic magnetic field concentration at the shield end, and thus the undesirable far track erasures due to anomalous shield domains do not occur. Consequently, the inverted magnetic head structure described herein according to various embodiments is also highly reliable in terms of read/write operations.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a main pole;
a trailing shield positioned near a trailing side of the main pole;
a side shield positioned near both sides of the main pole in a cross-track direction;
a leading shield positioned near a leading side of the main pole; and
a gap positioned between the main pole and the shields,
wherein a cross-section of the trailing shield at a media facing side thereof has a general trapezoidal shaped peripheral portion,
wherein bending points of the side shield are positioned between the leading and trailing shields,
opposing surfaces of the side shield that face the main pole above the bending points diverging from one another as they approach the bending points from the trailing shield and diverging from one another as they approach the bending points from the leading shield,
wherein the bending points both lie along an imaginary plane that extends through the main pole,
wherein a distance in the cross-track direction between bending points of the leading edge of the trailing shield is greater than MPw, wherein MPw is a width of a trailing edge of the main pole in the cross-track direction.

2. The magnetic head as recited in claim 1, wherein a cross-section of the main pole at a media facing side thereof has either a triangular shape, a trapezoidal shape, or a combination of a triangular shape and a trapezoidal shape.

3. The magnetic head as recited in claim 1, wherein a cross-section of an exterior perimeter of the gap at a media facing side thereof has a diamond shape characterized by a linear trailing edge about parallel to the cross-track direction, a pointed leading edge, and side edges extending between the trailing edge and the leading edge, each of the side edges comprising a first linear edge extending from the leading edge, a second linear edge extending from the trailing edge, and a point at an intersection of the first and second edge.

4. The magnetic head as recited in claim 1, wherein a cross-section of an exterior perimeter of the gap at a media facing side thereof is characterized by a linear trailing edge about parallel to the cross-track direction, a linear leading edge about parallel to the linear trailing edge, and side edges extending between the trailing edge and the leading edge, each of the side edges comprising a first linear edge extending from the leading edge, a second linear edge extending from the trailing edge, and a point at an intersection of the first and second linear edge.

5. The magnetic head as recited in claim 1, wherein the trapezoidal shape of the cross-section of the trailing shield at the media facing side thereof is positioned such that a wider side of the trapezoidal shape in the cross-track direction is a leading portion of the trailing shield.

6. The magnetic head as recited in claim 1, characterized in that Sg1 <Sg2 , wherein Sg1 is a distance in the cross-track direction between a bending point of a leading edge of the trailing shield and a trailing corner of the main pole nearest to the bending point, and Sg2 is a distance in the cross-track direction between a first point on an edge of the side shield parallel in the cross-track direction to the trailing corner of the main pole and the trailing corner of the main pole nearest to the first point.

7. The magnetic head as recited in claim 1, wherein a portion of the gap trailing the main pole has a length in a plane of a media facing side in a direction normal to the cross-track direction in a range from about 5 nm to about 50 nm.

8. The magnetic head as recited in claim 7, wherein the length of the portion of the gap trailing the main pole is in a range from about 10-25 nm.

9. The magnetic head as recited in claim 1, wherein a width of the main pole at a trailing edge thereof in the cross-track direction is in a range from about 60 nm to about 150 nm.

10. The magnetic head as recited in claim 1, wherein a width of a trailing edge of the trailing shield in the cross-track direction is less than about 1.5 times a width of the main pole at a trailing edge thereof in the cross-track direction.

11. The magnetic head as recited in claim 10, wherein the width of the trailing edge of the trailing shield in the cross-track direction is about equal to the width of the main pole at the trailing edge thereof in the cross-track direction.

12. The magnetic head as recited in claim 1, wherein a length of the trailing shield in a plane of a media facing side in a direction normal to the cross-track direction is in a range from about 25 nm to about 100 nm.

13. The magnetic head as recited in claim 12, wherein the trailing shield comprises two distinct materials, wherein a first material has a higher Bs and is positioned closer to a trailing edge of the trailing shield than the second material.

14. The magnetic head as recited in claim 13, wherein the length of the first material near the trailing edge of the trailing shield is in a range from about 40-100 nm.

15. The magnetic head as recited in claim 1, wherein an angle formed at an intersection of a leading edge and a side edge of the trailing shield is in a range from about 20° to about 60°.

16. The magnetic head as recited in claim 15, wherein the angle formed at the intersection of the leading edge and the side edge of the trailing shield is in a range from about 40-50°.

17. The magnetic head as recited in claim 1, characterized in that Sg2 <MPw, wherein Sg2 is a distance in the cross-track direction between a first point on an edge of the side shield parallel in the cross-track direction to the trailing corner of the main pole and the trailing corner of the main pole nearest to the first point, and MPw is a width of a trailing edge of the main pole in the cross-track direction.

18. A magnetic head, comprising:
a main pole;
a trailing shield positioned near a trailing side of the main pole;

a side shield positioned near both sides of the main pole in a cross-track direction;

a leading shield positioned near a leading side of the main pole; and a gap positioned between the main pole and the trailing shield, the side shield, and the leading shield, characterized in that $Sg1 < Sg2$, wherein $Sg1$ is a distance in the cross-track direction between a first bending point of a leading edge of the trailing shield and a trailing corner of the main pole nearest to the bending point, and $Sg2$ is a distance in the cross-track direction between a first point on an edge of the side shield parallel in the cross-track direction to the trailing corner of the main pole and the trailing corner of the main pole nearest to the first point, wherein bending points of the side shield are positioned between the leading and trailing shields, opposing surfaces of the side shield that face the main pole above the bending points diverging from one another as they approach the bending points from the trailing shield and diverging from one another as they approach the bending points from the leading shield, wherein the bending points both lie along an imaginary plane that extends through the main pole, wherein a distance in the cross-track direction between the first bending point and a second bending point of the leading edge of the trailing shield is greater than MPw, wherein MPw is a width of a trailing edge of the main pole in the cross-track direction.

19. The magnetic head as recited in claim 18, wherein the trailing shield comprises two distinct materials, wherein a first material has a higher Bs and is positioned closer to a trailing edge of the trailing shield than the second material.

20. The magnetic head as recited in claim 18, characterized in that $Sg2 < MPw$.

21. A magnetic head, comprising:

a main pole;

a trailing shield positioned near a trailing side of the main pole;

a side shield positioned near both sides of the main pole in a cross-track direction;

a leading shield positioned near a leading side of the main pole; and a gap positioned between the main pole and the trailing shield, the side shield, and the leading shield, characterized in that $Sg1 < Sg2$, wherein $Sg1$ is a distance in the cross-track direction between a bending point of a leading edge of the trailing shield and a trailing corner of the main pole nearest to the bending point, and $Sg2$ is a distance in the cross-track direction between a first point on an edge of the side shield parallel in the cross-track direction to the trailing corner of the main pole and the trailing corner of the main pole nearest to the first point, and characterized in that $Sg2 < MPw$, wherein MPw is a width of a trailing edge of the main pole in the cross-track direction, and wherein the trailing shield comprises two distinct materials, wherein a first material has a higher Bs and is positioned closer to a trailing edge of the trailing shield than the second material, wherein a width of a trailing edge of the first material of the trailing shield in the cross-track direction is less than about 1.5 times MPw.

\* \* \* \* \*